(12) United States Patent
Wright et al.

(10) Patent No.: US 10,796,494 B2
(45) Date of Patent: Oct. 6, 2020

(54) ADDING ATTRIBUTES TO VIRTUAL REPRESENTATIONS OF REAL-WORLD OBJECTS

(75) Inventors: Shawn C Wright, Sammamish, WA (US); Jeffrey Jesus Evertt, Kirkland, WA (US); Justin Avram Clark, Kirkland, WA (US); Christopher Harley Willoughby, Kenmow, WA (US); Mike Scavezze, Bellevue, WA (US); Michael A Spalding, Redmond, WA (US); Kevin Geisner, Mercer Island, WA (US); Daniel L. Osborn, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 504 days.

(21) Appl. No.: 13/186,666

(22) Filed: Jul. 20, 2011

(65) Prior Publication Data

US 2012/0306853 A1 Dec. 6, 2012

Related U.S. Application Data

(60) Provisional application No. 61/493,859, filed on Jun. 6, 2011.

(51) Int. Cl.
*G06K 1/00* (2006.01)
*G06T 1/00* (2006.01)
(Continued)

(52) U.S. Cl.
CPC ...... *G06T 19/20* (2013.01); *G06T 2219/2012* (2013.01); *G06T 2219/2021* (2013.01); *G06T 2219/2024* (2013.01)

(58) Field of Classification Search
CPC .......... G06K 1/00; G06T 1/00; A63F 2300/69
(Continued)

(56) References Cited

U.S. PATENT DOCUMENTS

| 4,288,078 A | 9/1981 | Lugo |
| 4,627,620 A | 12/1986 | Yang |

(Continued)

FOREIGN PATENT DOCUMENTS

| CN | 101254344 B | 6/2010 |
| EP | 0583061 A2 | 2/1994 |

(Continued)

OTHER PUBLICATIONS

Farhadi, Alireza, et al. "Describing objects by their attributes." Computer Vision and Pattern Recognition, 2009. CVPR 2009. IEEE Conference on. IEEE, 2009.*

(Continued)

*Primary Examiner* — Shivang I Patel
(74) *Attorney, Agent, or Firm* — Shook, Hardy & Bacon LLP

(57) ABSTRACT

A method, medium, and virtual object for providing a virtual representation with an attribute are described. The virtual representation is generated based on a digitization of a real-world object. Properties of the virtual representation, such as colors, shape similarities, volume, surface area, and the like are identified and an amount or degree of exhibition of those properties by the virtual representation is determined. The properties are employed to identify attributes associated with the virtual representation, such as temperature, weight, or sharpness of an edge, among other attributes of the virtual object. A degree of exhibition of the attributes is also determined based on the properties and their degrees of exhibition. Thereby, the virtual representation is provided (Continued)

with one or more attributes that instruct presentation and interactions of the virtual representation in a virtual world.

17 Claims, 5 Drawing Sheets

(51) Int. Cl.
    *H04N 1/00*     (2006.01)
    *G06T 19/20*     (2011.01)

(58) Field of Classification Search
    USPC .............................. 345/419, 581; 463/31, 32
    See application file for complete search history.

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,019,748 B2 | 3/2006 | Raskar |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |

(56) References Cited

U.S. PATENT DOCUMENTS

| | | | |
|---|---|---|---|
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,668,376 B2 | 2/2010 | Lin et al. | |
| 7,680,298 B2 | 3/2010 | Roberts et al. | |
| 7,683,954 B2 | 3/2010 | Ichikawa et al. | |
| 7,684,590 B2 | 3/2010 | Kampchen et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,840,059 B2 | 11/2010 | Winn et al. | |
| 7,843,471 B2 | 11/2010 | Doan et al. | |
| 7,852,262 B2 | 12/2010 | Namineni et al. | |
| RE42,256 E | 3/2011 | Edwards | |
| 7,898,522 B2 | 3/2011 | Hildreth et al. | |
| 7,903,109 B2 * | 3/2011 | Rurin | G06T 15/20 345/158 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,427,503 B2 * | 4/2013 | Yu et al. | 345/619 |
| 2002/0188372 A1 | 12/2002 | Lane et al. | |
| 2003/0058280 A1 | 3/2003 | Molinari et al. | |
| 2003/0128207 A1 | 7/2003 | Sawada | |
| 2003/0222977 A1 * | 12/2003 | Yoshino | H04N 13/0495 348/51 |
| 2006/0106820 A1 | 5/2006 | Bender et al. | |
| 2008/0026838 A1 | 1/2008 | Dunstan et al. | |
| 2008/0274805 A1 | 11/2008 | Ganz et al. | |
| 2009/0066690 A1 * | 3/2009 | Harrison | 345/419 |
| 2009/0129630 A1 * | 5/2009 | Gloudemans et al. | 382/103 |
| 2009/0138377 A1 | 5/2009 | Oh et al. | |
| 2009/0164505 A1 | 6/2009 | Tudose | |
| 2010/0302247 A1 | 12/2010 | Perez et al. | |
| 2012/0041971 A1 * | 2/2012 | Kim | G06F 17/30247 707/769 |
| 2012/0257787 A1 * | 10/2012 | Ogasawara | G06T 7/136 382/103 |
| 2012/0264510 A1 * | 10/2012 | Wigdor | A63F 13/213 463/31 |
| 2012/0299961 A1 * | 11/2012 | Ramkumar | G06F 17/30047 345/632 |

FOREIGN PATENT DOCUMENTS

| | | | |
|---|---|---|---|
| JP | 08044490 A1 | 2/1996 | |
| JP | 2002-288687 | 10/2002 | |
| JP | 2003036450 A | 2/2003 | |
| JP | 2003099799 A | 4/2003 | |
| JP | 2004152164 A | 5/2004 | |
| JP | 2005196670 A | 7/2005 | |
| KR | 10-2008-003441 | 4/2008 | |
| KR | 20110041383 A | 4/2011 | |
| WO | 93/10708 A1 | 6/1993 | |
| WO | 97/17598 A1 | 5/1997 | |
| WO | 99/44698 A1 | 9/1999 | |
| WO | 2007093800 A2 | 8/2007 | |
| WO | 2009127701 A1 | 10/2009 | |
| WO | 2010133943 A1 | 11/2010 | |

OTHER PUBLICATIONS

Hwang, Won-Il, et al. "Cinema comics: Cartoon generation from video stream." GRAPP 6 (2006): 299-304.*

Lok, et al., "Incorporating Dynamic Real Objects into Immersive Virtual Environments," In Proceedings of ACM SIGGRAPH 2003 Papers, vol. 22, Issue 3, Jul. 2, 2003, pp. 31-40.

Golcu, et al., "Perceptual Learning of Object Shape," In Journal of Neuroscience: The Official Journal of the Society for Neuroscience, vol. 29, Issue 43, Oct. 28, 2010, pp. 13621-13629.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

(56) References Cited

OTHER PUBLICATIONS

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
"First Office Action and Search Report Issued in Chinese Patent Application No. 201280028075.X", dated Jul. 3, 2015, 14 Pages.
"Office Action Issued for Japanese Patent Application No. 2014-514565", dated Jun. 23, 2016, 7 Pages.
"Office Action Issued in Japanese Patent Application No. 2014-514565", dated Feb. 9, 2016, 8 Pages.
"Notice of Allowance Issued in Korean Patent Application No. 10-2013-7032143", dated Dec. 19, 2018, 4 Pages.
"Office Action Issued in Korean Patent Application No. 10-2013-7032143", dated Mar. 20, 2018, 19 Pages.
"Office Action Issued in European Application No. 12797196.8", dated May 16, 2018, 6 Pages.
Eckes, et al., "Virtual Human" Anthropomorphe Interaktionsagenten, Published on: May 16, 2006, 57 pages. Available on: http://www.virtual-human.org/Vortraege/VH_OVERVIEW_2006.pdf.
"Office Action received for European Patent Application No. 12797196.8", dated Aug. 14, 2014, 8 Pages.
Anonymous: "EA Forums—Suggested attributes for a FIFA 10 style training system", Published on: Nov. 6, 2010, Available on: http://forum.ea.com/eaforum/posts/list/856106.page.
International Search Report and Written Opinion in PCT/US2012/040952, dated Feb. 21, 2013, 10 pages.

\* cited by examiner

ADDING ATTRIBUTES TO VIRTUAL REPRESENTATIONS OF REAL-WORLD OBJECTS

CROSS-REFERENCE TO RELATED APPLICATIONS

This application claims priority to U.S. Provisional Patent Application No. 61/493,859 filed Jun. 6, 2011 the disclosure of which is hereby incorporated herein by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to associate attributes with virtual representations of real-world objects.

In an embodiment, a real-world object is digitized to generate a virtual representation thereof. A number of characteristics of the virtual representation are identified and a measure of the exhibition of those characteristics is determined. For example, a real-world object might be red in color. Thus, the virtual representation has the characteristic of being red and a measure of the location of the red color on a color spectrum is determined.

Based on the characteristics, an attribute is identified and added to the virtual representation to instruct interactions of the virtual representation in a virtual world. Continuing the above example, the attribute might be a temperature of the virtual representation in a virtual world—the temperature being identified based on the color characteristic. And the degree of the temperature might be determined based on the measure of the color on the color spectrum. For instance, red is defined as hot and the degree of hotness from warm to "on fire" is determined based on the location of the exhibited color on a color spectrum, e.g. reds at the lower end of the spectrum indicate lower temperatures and those at the higher end of the spectrum indicate higher temperatures. Thus, a virtual representation having the characteristic "red" is given the attribute "hot" and, when presented, the virtual representation appears to be on fire.

DESCRIPTION OF THE DRAWINGS

Illustrative embodiments of the invention are described in detail below with reference to the attached drawing figures, and wherein.

DETAILED DESCRIPTION

Figure 1:
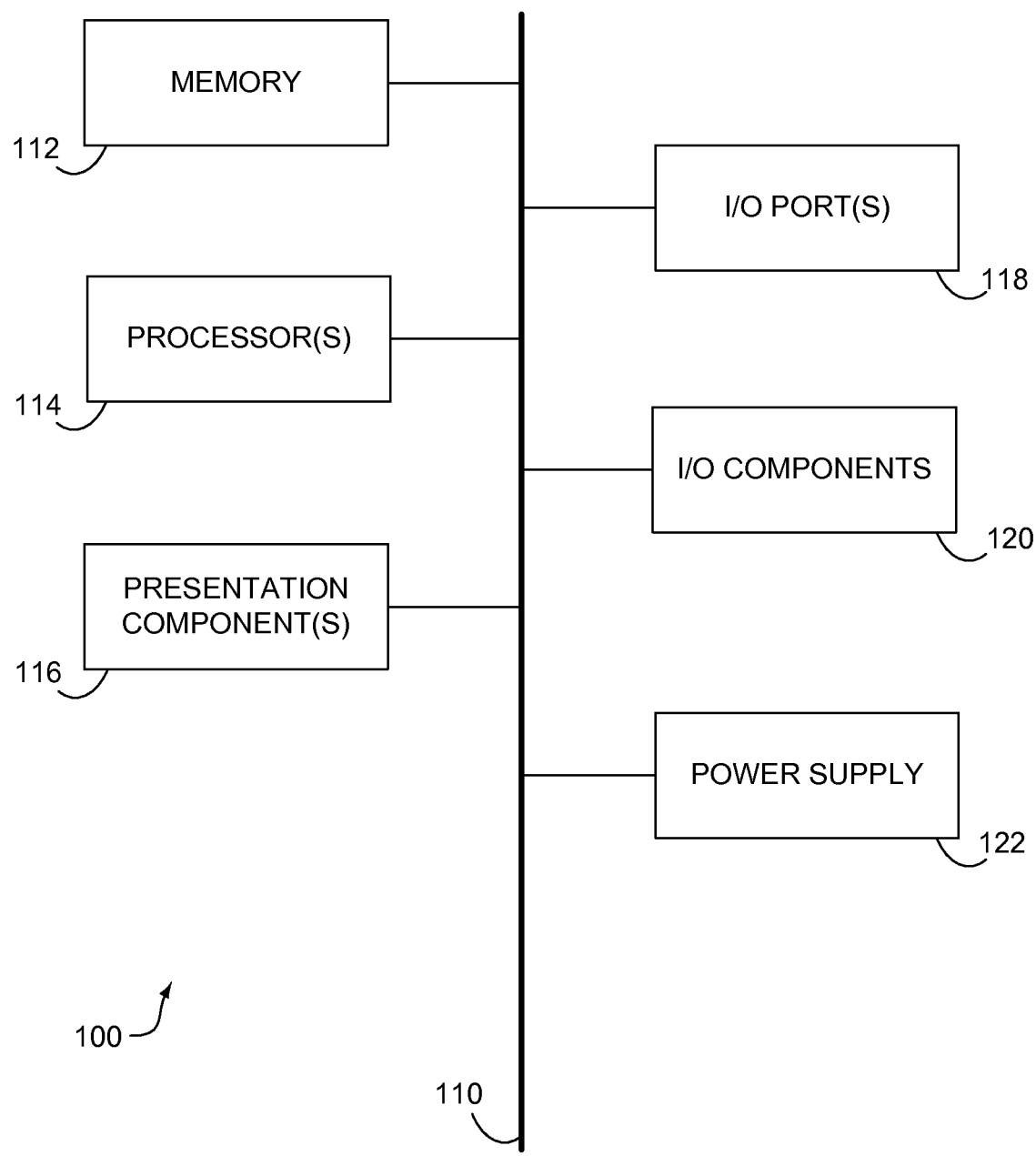
FIG. 1 is a block diagram depicting an exemplary computing device suitable for use in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention describe methods, systems, and media for associating or adding attributes to a virtual representation of a real-world object. A real-world object includes any available physical object like, for example, a ball, a stuffed animal, a stick, a cup, a book, or a spoon.

A virtual representation, or virtual object, as described herein, comprises a representation of the real-world object that is generated by a computing device. The terms virtual representation and virtual object are used interchangeably herein. The virtual representation is generated by digitizing the real-world object, e.g. creating a virtual object based on one or more images of the real-world object. Digitization of the real-world object is completed in any desired manner. In an embodiment, digitization of the real-world object is completed using a method described in U.S. Patent Application No. 61/493,844, entitle "OBJECT DIGITIZATION," filed on Jun. 6, 2011, the disclosure of which is hereby incorporated herein by reference.

The virtual object represents the real-world object in a virtual world generated by one or more computing devices. The virtual object has characteristics such as shape, color, volume, surface area, dimensions, and surface textures that are derived from the images of the real-world object. However, without embodiments of the invention, the virtual object is only recognized by a computing device as an object with an appearance defined by the characteristics. The computing device does not otherwise recognize or understand other non-visual attributes of the virtual object. For example, a virtual representation of a knife is not recognized by the computing device as being sharp—embodiments of the invention determine and add such attributes to the virtual representation.

In an embodiment, the added attributes mimic those of the real-world object such as a knife being sharp. The added attributes might also mimic those that are expected of a real-world object of a given type. For example, a toy knife is likely not sharp in the real-world however, the virtual representation may be given sharpness as an added attribute. The attributes may also add arbitrary properties to the virtual representation that are not present in the real-world object. For instance, a virtual object that has a red color may be associated with the attribute "hot" or a virtual object that has smooth edges might be associated with the attribute "wet" while the real-world counterpart objects are neither hot nor wet. Determining attributes to add to a virtual representation is described in greater detail below.

In an embodiment of the invention, a method for associating attributes with a virtual object is described. A real-world object is digitized to generate a virtual representation of the real-world object in a virtual space. The virtual representation depicts a plurality of characteristics of the real-world object. A first characteristic exhibited by the virtual representation is detected. The characteristic is mapped to an attribute to add to the virtual representation. The virtual representation is provided with the attribute.

In another embodiment, a method for associating an attribute with a virtual representation is described. Characteristics exhibited by a virtual representation of a real-world object are identified. A degree of exhibition of each of the characteristics by the virtual representation is quantified. An attribute to add to the virtual representation is determined based on the degree of exhibition of the characteristics. The virtual representation having the attribute is provided.

In another embodiment, a virtual object that includes a three-dimensional virtual representation of a real-world object constructed from a digitization of the real-world object based on a plurality of captured images is described. The virtual object also includes an attribute associated with the virtual representation that instructs interactions between the virtual representation and a virtual world. The attribute is associated with the virtual representation by identifying characteristics exhibited by the virtual representation, quantifying a degree of exhibition of each of the characteristics by the virtual representation, and determining the attribute to add to the virtual representation based on the degree of exhibition of one or more of the characteristics.

Referring initially to FIG. 1, an exemplary operating environment for implementing embodiments of the present invention is shown and designated generally as a computing device 100. The computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output ports 118, one or more input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices or any other computer-readable device that can be used to encode desired information and be accessed by computing device 100. Computer-readable media and computer-storage media are not inclusive of carrier waves, signals, or other forms of transitory media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or I/O components 120. The presentation component(s) 116 present data indications to a user or other device. Exemplary presentation components include a display device, a speaker, a printing component, a vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
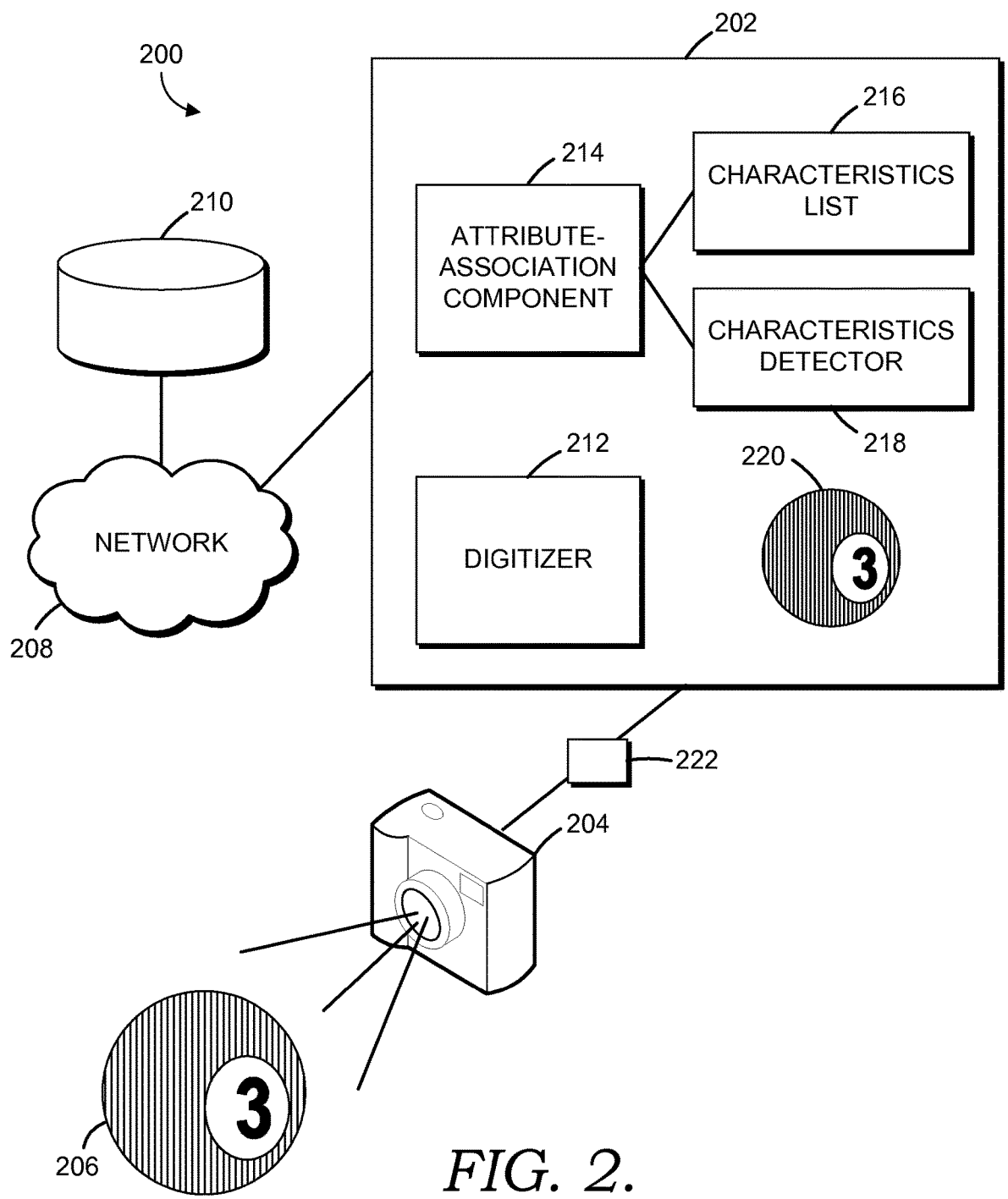
FIG. 2 is a block diagram of an exemplary operating environment suitable for use in accordance with an embodiment of the invention.

With reference now to FIG. 2, an exemplary computing environment 200 that is suitable for use in accordance with an embodiment of the invention is described. The environment 200 includes a computing device 202, a camera 204, a real-world object 206, a network 208, and a data store 210. The computing environment 200 is one exemplary computing environment, of which there are many, that is usable to add attributes to a virtual representation of a real-world object in accordance with embodiments of the invention. Various components are depicted in the environment 200 to aid in explanation of embodiments of the invention however, other additional or alternative components might be employed and may be further distributed or consolidated among one or more computing devices, e.g. a computing device can have an integral camera.

The computing device 202 comprises any one or more computing devices, such as the computing device 100. In an embodiment, the computing device 202 comprises a gaming device. The computing device 202 may be communicatively coupled to the network 208 for communication with one or more other computing devices and the data store 210 as is known in the art. The network 208 comprises any communications network, such as, for example and not limitation, the Internet, an intranet, an ethernet, a local area network, or a wide area network, among others.

The data store 210 includes any data storage device or medium useable by the computing device 202. In an embodiment, the data store 210 is a data repository for a cloud computing environment as is known in the art. The data store 210 may provide storage of characteristics of real-world objects and attributes of virtual representations of real-world objects that have been digitized by one or more users. The data store 210 might also contain one or more mapping schema for mapping characteristics to attributes to add to virtual representations as described below.

The camera 204 includes a digital, still or video camera that is useable to capture one or more images of the real-world object 206. In an embodiment, the camera 204 is a film camera and a scanner is employed to digitize the images for use by the computing device 202. The camera 204 is separate from the computing device 202 and is communicatively coupled thereto wirelessly or through a wired connection. Or the camera 204 is integrated with the computing device 202.

As described previously, the real-world object 206 is any physical, real-world object. As depicted in FIG. 2, the real-world object 206 is a red billiard ball however, any object might be used.

Returning to the computing device 202, a digitizer component 212, an attribute-association component 214, a characteristics list 216, a characteristics detector 218, and a virtual representation 220 are included therein. In an embodiment, one or more of the components 212, 214, 216, 218, and 220 are distributed among one or more other computing devices and are accessed by the computing device 202 via the network 208.

As described above, the digitizer component 212 employs any available means for digitizing or creating a virtual representation of a real-world object. The digitizer 212 receives one or more images 222 of the real-world object 206 from the camera 204. In an embodiment, the images 222 include at least one image 222 of a front of the real-world object 206 and one image 222 of the back of the real-world object 206. These images 222 are useable by the digitizer to generate the three-dimensional virtual representation 220 of the real-world object 206. In another embodiment, any number of images 222 are used to generate a two- or three-dimensional virtual representation 220 of the real-world object 206.

The virtual representation 220 uses and is based on any available virtual modeling techniques. For example, the virtual representation 220 is based on red, green, and blue color and depth data obtained from images (RGBD images) of the real-world object. The virtual representation might also include a three-dimensional point cloud, a triangle mesh, a texture, a skeleton, and a rigging, among other components.

The attribute-association component 214 employs the virtual representation 220 of the real-world object 206 that is generated by the digitizer 212 to identify one or more characteristics of the virtual representation 220, to determine attributes to add to the virtual representation 220, and to add those attributes to the virtual representation 220, as described more fully below. In an embodiment, the characteristics of the virtual representation 220 are identified based on the characteristics list 216.

The characteristics list 216 includes a plurality of characteristics that might be present in a virtual representation. Each of the characteristics from the list 216 includes an associated characteristics detector 218, or a single detector 218 is associated with multiple characteristics from the list 216. The characteristics list 216 is stored in a memory of the computing device 202 or is stored remotely, for example, in the data store 210. The characteristics list 216 is employed globally across applications on the computing device that employ virtual representations or the characteristics list 216 is application specific. Application-specific lists 216 are useable to identify unique characteristics and to provide unique attributes to virtual representations based on an application using the virtual representation or a context therein.

The detector 218 comprises an application, code segment, or program object configured to analyze one or more data associated with the virtual representation 220 to identify the presence of an associated characteristic. In an embodiment, the detector 118 identifies a degree of exhibition of the characteristic by the virtual representation 220. For example, for the characteristic "color=red" the detector 118 determines a degree at which the virtual representation exhibits the color red, e.g. a virtual representation of a purple object only exhibits a small amount of the color red, while a virtual representation of a red object exhibits a large amount of the color red. The detector 118 produces a value for the degree of exhibition such as a percentage of true red in the color of the virtual object or a color spectrum value that identifies the color of the virtual object, among other potential values. In an embodiment, the detector 118 provides a binary value that indicates only whether a virtual representation has the characteristic, e.g. "red" or "not red."

Figure 3:
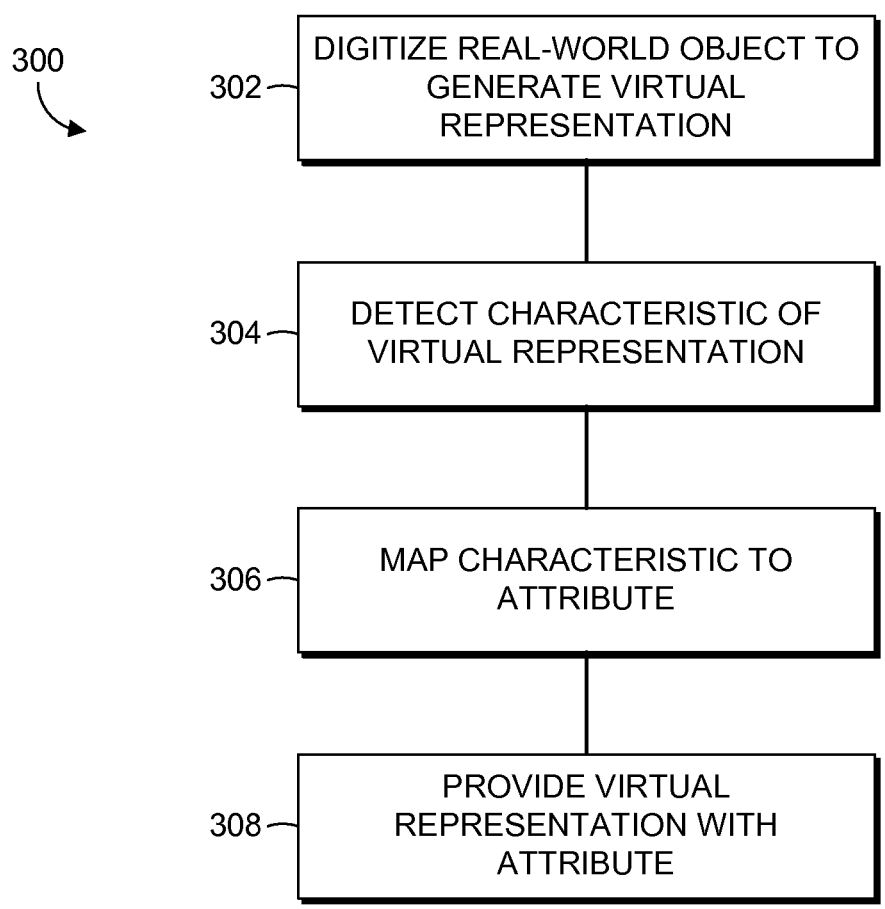
FIG. 3 is a flow diagram depicting a method for associating attributes with a virtual object in accordance with an embodiment of the invention.

With reference now to FIG. 3, a method 300 for associating attributes with a virtual object in accordance with an embodiment of the invention is described. Initially, a real-world object is selected by a user. For example, the real-world object might comprise an axe 400 depicted in FIG. 4A or a red billiard ball 500 depicted in FIG. 5A or any other desired real-world object. In an embodiment, an application such as a game application running on a computing device requests a user to provide a real-world object. The user may be requested to provide a real-world object with a desired property such that the virtual representation of the real-world object is useable in a game scenario.

The real-world object is an actual object, e.g an actual axe or billiard ball, or the real-world object is a toy or replica version of the real-world object, e.g. a toy axe or rubber ball painted to represent a billiard ball. Replica objects can provide a degree of safety while also exhibiting similar or identical visual characteristics as their "real" counterparts. Such real-world objects, whether real or replica might be provided with an application. For example, a game application kit might be provided with a number of objects for use with the game application. Or in an embodiment, the real-world objects are arbitrarily selected by a user from available items.

A number of digital images of a real-world object are captured from one or more different angles. The images are employed to digitized the real-world object and generate a virtual representation of the real-world object in a virtual space, at a step 302. The digitization captures a plurality of characteristics of the real-world object in the virtual representation. The characteristics include color, surface textures or appearances and features, size, proportions, volume, surface area, and object shape, to name a few. The virtual representation generally resembles the visual appearance of the real-world object. Or in an embodiment, one or more processes are employed to generate a virtual representation with a different appearance than the real-world object, e.g. the virtual representation may be provided with a cartoon-like appearance.

At a step 304, a characteristic is detected in the virtual representation. In an embodiment, the characteristic is identified in a predetermined list of characteristics to look for in a virtual representation. The characteristics might include a shape, volume, surface area, dimension, color, number of limbs, reflectivity, shape noisiness, among others. Most of these characteristics are self explanatory however, the number of limbs refers to a number of identified appendages extending from a main body of the virtual object, the reflectivity refers to the shininess or glare exhibited by the virtual object, and the shape noisiness refers to the smoothness of the shapes perimeter, for example a ball would have a low shape noisiness while a sea urchin would have a high shape noisiness. The characteristics are detected generally, e.g. "color", or are detected more specifically, e.g. red, blue, green.

In an embodiment, a detector is executed to analyze the virtual representation for presence of the characteristic. A plurality of detectors are each dedicated to a respective characteristic in the list or a single detector analyzes for a number of characteristics. The detector may provide a binary-type detection of the characteristics or may determine a degree of exhibition of the characteristic based on a sliding scale. For example, the detector might simply determine whether a virtual representation has a given shape; when a virtual representation has the given shape, the detector provides a positive indication and, when the virtual representation does not have the given shape the detector provides a negative indication. Or the detector might determine a degree of similarity between the shape of the virtual representation and a predefined shape, e.g the detector indicates a similarity based on a scale between an exact match to a complete mismatch.

At a step, 306 a mapping schema is employed to map the detected characteristics and/or the detected degrees of exhibition thereof to one or more attributes to add to the virtual representation. The mapping schema is predetermined and may be employed globally across a number of applications or may be specific to an individual application. The mapping schema might also be context-specific to a particular portion of an application. For example, in a gaming application, a mapping schema for a portion of the game that involves hand-to-hand combat might be different than a mapping schema employed by a portion involving automobile driving.

The mapping schema includes one-to-one, many-to-many, many-to-one, and/or one-to-many relationships between characteristics and attributes. As such, attributes can be identified based on a single or multiple characteristics of a virtual representation.

Figure 4A:
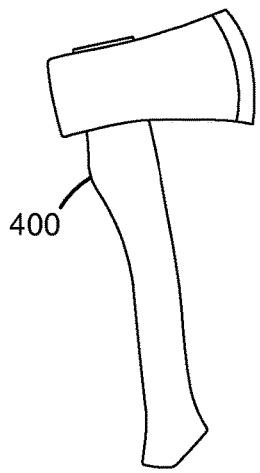
FIG. 4A is graphical representation of a real-world object in accordance with an embodiment of the invention.
Figure 4B:
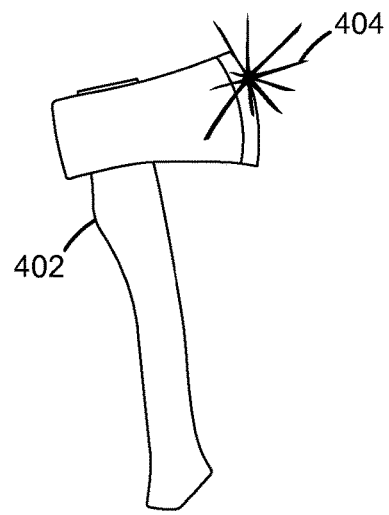
FIG. 4B is a graphical representation of a virtual representation of the real-world object of FIG. 3A depicting an attribute in accordance with an embodiment of the invention.

By mapping characteristics of a virtual representation to attributes to add to the virtual representation, additional intelligence is added to the generation of the virtual representation. For example, as depicted in FIGS. 4A and 4B, a virtual representation 402 of a real-world axe 400 is generated. Characteristics, such as the shape and color of the virtual representation 402 are detected. In an embodiment, the shape is determined to be similar to that of a shape known by the computing device and the shape characteristic is given a high degree of similarity to that known shape (the known shape being for example, a hatchet). Thus, known qualities of the known hatchet shape might be added to the virtual representation 402. The characteristic "color" might also indicate a similarity to the known hatchet shape. For instance, the virtual representation 400 may exhibit two main colors, brown and grey on the handle and blade of the axe, respectively. Additional characteristics like the presence of a smooth, thin edge along the blade of the axe in the virtual representation 402 might also be employed. In an embodiment, the detected shape and color data are mapped to the attribute "sharp" and that attribute is added to the virtual representation 402 as depicted by the starburst 404 on the edge of the blade.

In an embodiment, one or more algorithms are also employed to determine one or more confidence levels for the correlation between the characteristics and attributes. The confidence level calculations may use the degree of exhibition of the characteristics to inform the calculation. In an embodiment, the confidence level calculations are integral with the mapping schema or are used to generate the mapping schema.

As such, the virtual representation 402 of the real-world axe 400 not only includes a representation that looks like the axe 400 but, also is sharp like the axe 400. This attribute is useable by an application to inform or instruct interactions of the virtual representation 402 in a virtual world. For example, the virtual representation 402 might be employed in a virtual world to chop down a tree. Without the addition of the "sharp" attribute to the virtual representation 402, the application would not be informed how the virtual representation 402 should affect objects in the virtual world.

Figure 5A:
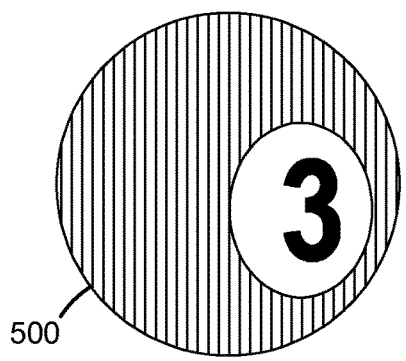
FIG. 5A is a graphical representation of another real-world object in accordance with an embodiment of the invention.
Figure 5B:
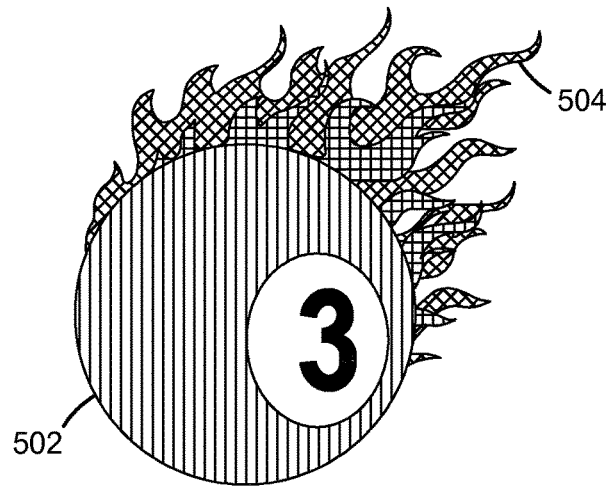
FIG. 5B is a graphical representation of a virtual representation of the real-world object of FIG. 5A depicting an attribute in accordance with an embodiment of the invention.
Figure 5C:
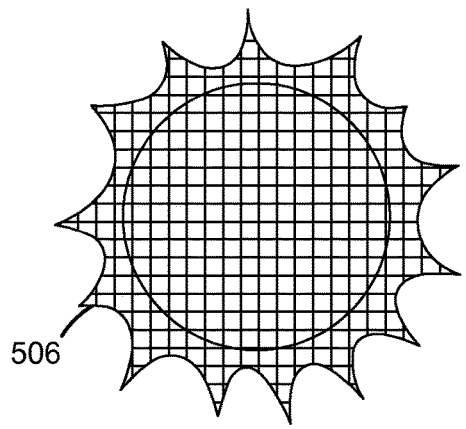
FIG. 5C is a graphical representation of a virtual representation of the real-world object of FIG. 5A depicting an attribute in a different manner than FIG. 5B in accordance with an embodiment of the invention.

The mapping schema need not map the characteristics to an attribute expected of a real-world object, e.g. an axe having a sharp blade. For example, as depicted in FIGS. 5A-5C, a real-world object 500 comprises a red billiard ball. As described previously, detectors analyzing for the characteristic "color" identify the real-world object 500 as being red. The mapping schema maps the color characteristic onto an attribute for the temperature of an object—the color red being mapped to "hot." The detectors might also detect a position of the exhibited red color on a color spectrum to identify a virtual temperature based on the color. As such, a virtual representation 502 of the red billiard ball 500 is associated with the attribute of being hot and flames 504 are added to the virtual representation to visually indicate such. Alternatively, an entirely different appearance might be provided to produce a virtual representation 506 that masks or changes the appearance of the real-world object 500 to look like a flaming ball or sun.

With continued reference to FIG. 3, the virtual representation, with the one or more added attributes, is provided, as depicted at a step 308. The virtual representation is provided to any application and is useable in any desired manner within the application. In an embodiment, the application is responsible for one or more of digitizing the real-world object, adding attributes to the virtual representation, and determining how the virtual representation is to be presented visually. In an embodiment, the application completes these processes at runtime. The visual representation may include one or more features that depict an added attribute, such as the starburst 404, or flames 504 of FIGS. 4B and 5B, or the added attribute may not be visually depicted. In an embodiment, the added attribute is only used to instruct interactions between the virtual representation and a virtual world.

Figure 6:
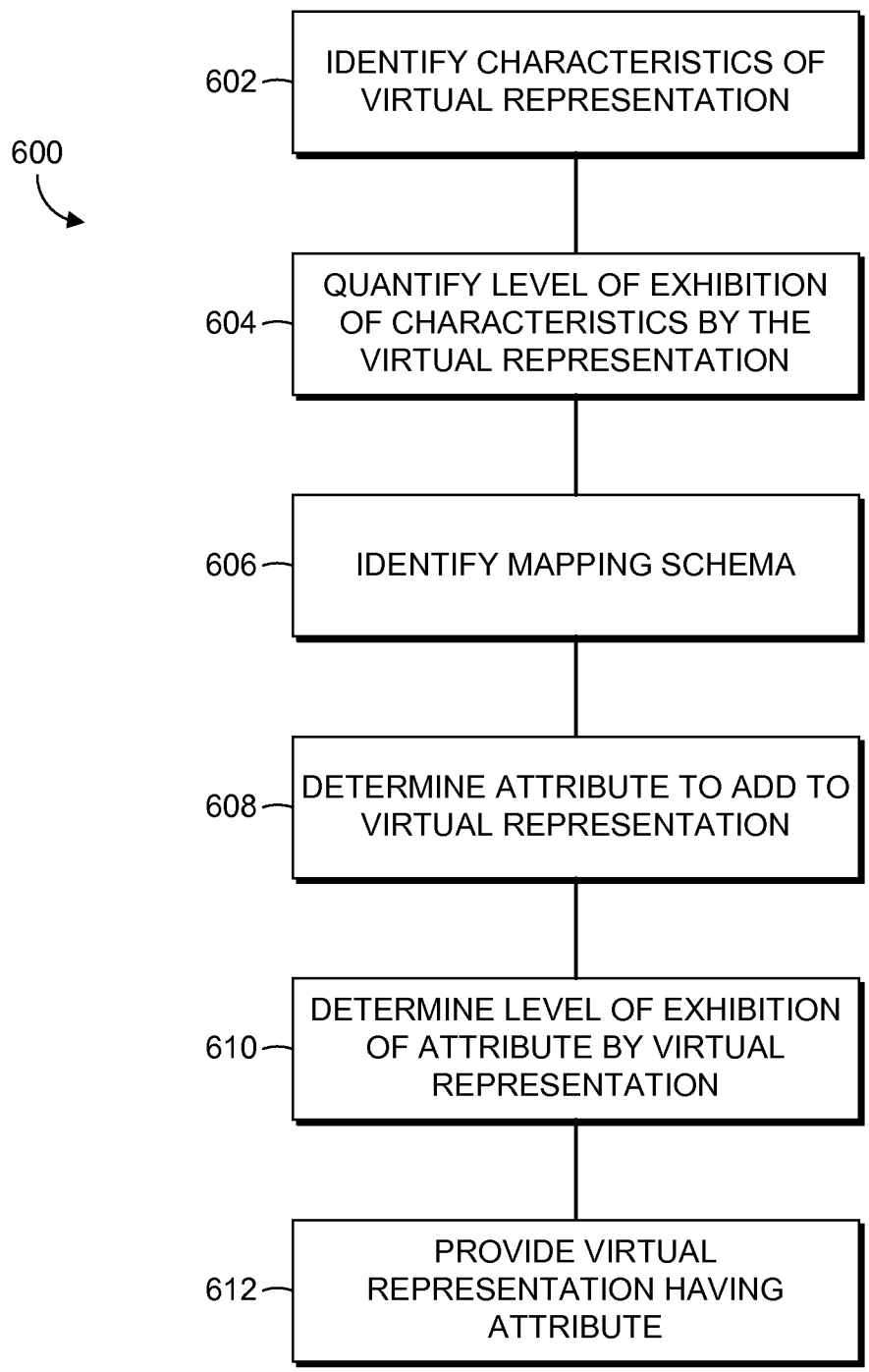
FIG. 6 is a flow diagram depicting a method for associating an attribute with a virtual representation in accordance with an embodiment of the invention.

With reference now to FIG. 6, method 600 for associating an attribute with a virtual representation is described in accordance with an embodiment of the invention. At a step 602, a plurality of characteristics exhibited by a virtual representation of a real-world object is identified. The virtual representation is generated by any digitization means available. In an embodiment, the digitization of the real-world object is completed at runtime by a personal computing device such as a laptop or gaming console. At a step 604, a degree of exhibition of each of the characteristics in the virtual representation is quantified. The degree of exhibition is determined on a predetermined scale or may simply indicate a binary value.

At a step 606, a mapping schema is identified for use in mapping one or more of the characteristics to one or more attributes to be added to the virtual representation. The mapping schema is identified based on an application in which the virtual representation is to be used. Or the mapping schema is identified based on a particular context within such an application.

Based on one or more of the characteristics in the plurality of characteristics and based on the degree of exhibition of those characteristics, an attribute is identified for addition to the virtual representation using the identified mapping schema, as depicted at a step 608. The attribute is identified using degrees of exhibition of one or several of the characteristics and may correspond with properties expected of the real-world object or might be arbitrary with respect thereto. Additionally, in an embodiment, a degree or intensity of expression of the attribute by the virtual representation is determined, as depicted at a step 610. The degree or intensity of expression is determined based on the degree of exhibition of the associated characteristics by the virtual representation. For example, a virtual representation that is light blue in color might be given the attribute of being cool, while a virtual representation that is dark blue might be given the attribute of being frozen.

At a step 612, the virtual representation with the added attributes is provided. The virtual representation might be provided to an application for use in a virtual world scenario. The application may determine visual features to apply to the virtual representation to indicate one or more of the attributes. The application may also use the attributes to instruct interaction of the virtual representation in a virtual world. For example, a virtual representation might be provided with the attribute of being heavy. As such, the application uses the heavy attribute to instruct algorithms for the physics of movements of the virtual representation in a virtual world.

In an embodiment of the invention, a user is enabled to arbitrarily select an item for digitization. The item need not be previously known or contemplated by designers of an application or digitization component. Accordingly, attributes of such specific objects also need not be previously contemplated. In an embodiment, attributes are identified and added to virtual representations based on identified characteristics of those virtual representations and not on predefined attributes of specific, anticipated, preprogrammed real-world objects. Thus, additional attributes or intelligence with respect to the qualities of a virtual representation of an arbitrary real-world object may be incorporated into a virtual world.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-readable media having computer-executable instructions embodied thereon that, when executed, perform operations comprising:
   digitizing a real-world object to generate a virtual representation of the real-world object in a virtual space;
   analyzing the virtual representation to automatically detect a first characteristic exhibited by the virtual representation;
   determining a non-visual attribute to add to the virtual representation based on the first characteristic using a predetermined mapping schema mapping the non-visual attribute to the first characteristic; and
   providing the virtual representation with the non-visual attribute in the virtual space, the non-visual aspect controlling interactions of the virtual representation with other virtual objects in the virtual space.

2. The media of claim 1, wherein a degree of exhibition of the first characteristic is detected.

3. The media of claim 2, wherein determining the non-visual attribute to add to the virtual representation includes using the degree of exhibition of the first characteristic to determine a second degree of exhibition of the non-visual attribute.

4. The media of claim 2, wherein the degree of exhibition comprises a measure of one or more of a similarity of the shape of the virtual representation with a predefined shape, a volume, a surface area, a dimension, a color spectrum exhibited by the virtual representation, a noisiness of the shape of the virtual representation, a number of limbs, and a reflectivity.

5. The media of claim 1, wherein the first characteristic comprises one or more of a shape, volume, surface area, dimension, surface texture, or a color exhibited by the virtual representation.

6. The media of claim 1, wherein digitizing the real-world object to generate a virtual representation of the real-world object in a virtual space includes generating one or more of a texture map, a rigging, and a skeleton, and wherein the first characteristic exhibited by the virtual representation is detected from one or more of the texture map, the rigging, and the skeleton.

7. The media of claim 1, wherein the predetermined mapping schema is context specific.

8. The media of claim 1, wherein the virtual representation is generated and the non-visual attribute is added at runtime.

9. A method comprising:
   analyzing a virtual representation of a real-world object to automatically identify a plurality of characteristics exhibited by the virtual representation of the real-world object;
   automatically quantifying, by a computing device having a processor and a memory, a degree of exhibition of each of the characteristics in the plurality of characteristics exhibited by the virtual representation;
   automatically determining a non-visual attribute to add to the virtual representation based on the degree of exhibition of one or more of the characteristics in the plurality of characteristics exhibited by the virtual representation; and providing the virtual representation having the non-visual attribute in a virtual space, the non-visual aspect controlling interactions of the virtual representation with other virtual objects in the virtual space.

10. The method of claim 9, wherein a second degree of exhibition of the non-visual attribute is determined based on the degree of exhibition of the one or more characteristics in the plurality.

11. The method of claim 9, wherein determining the non-visual attribute to add to the virtual representation further comprises:

identifying a mapping schema for mapping the plurality of characteristics to the non-visual attribute, wherein the mapping schema is one or more of application specific and context specific.

12. The method of claim 9, wherein the plurality of characteristics exhibited by the virtual representation are identified using a predetermined list of characteristics by analyzing the virtual representation to determine which characteristics from the predetermined list of characteristics are present in the virtual representation.

13. The method of claim 12, wherein a detector application is provided for each characteristic in the predetermined list and the detector application determines the degree of exhibition of a respective characteristic with respect to a predetermined range.

14. The method of claim 9, wherein the non-visual attribute is employed for determining a visual feature that changes the appearance of the virtual representation.

15. A computerized method comprising:

creating a virtual representation of a real-world object constructed from a digitization of the real-world object based on one or more captured images of the real-world object;

analyzing the virtual representation using a predetermined list of characteristics usable to assign non-visual attributes to automatically identify a first characteristic exhibited by the virtual representation;

automatically quantifying a degree of exhibition of the first characteristic exhibited by the virtual representation;

accessing a mapping schema that maps a plurality of virtual representation characteristics to a plurality of non-visual attributes;

automatically determining, from the mapping schema, a non-visual attribute mapped to the first characteristic exhibited by the virtual representation; and associating the non-visual attribute with the virtual representation to control interactions between the virtual representation and other virtual objects in a virtual world, wherein a degree of exhibition of the non-visual attribute for the virtual representation is determined based on the degree of exhibition of the first characteristic by the virtual representation.

16. The method of claim 15, wherein the digitization of the real-world object and construction of the virtual representation are completed at runtime.

17. The method of claim 15, wherein the determining the non-visual attribute to add to the virtual representation is based on a mapping that changes with respect to one or more of an application and a context within an application in which the virtual representation is used, and wherein the non-visual attribute changes based on the mapping.

* * * * *